Oct. 24, 1933.  H. R. SEARING  1,932,088
ALTERNATING CURRENT NETWORK DISTRIBUTION SYSTEM
Filed April 4, 1930   2 Sheets-Sheet 1
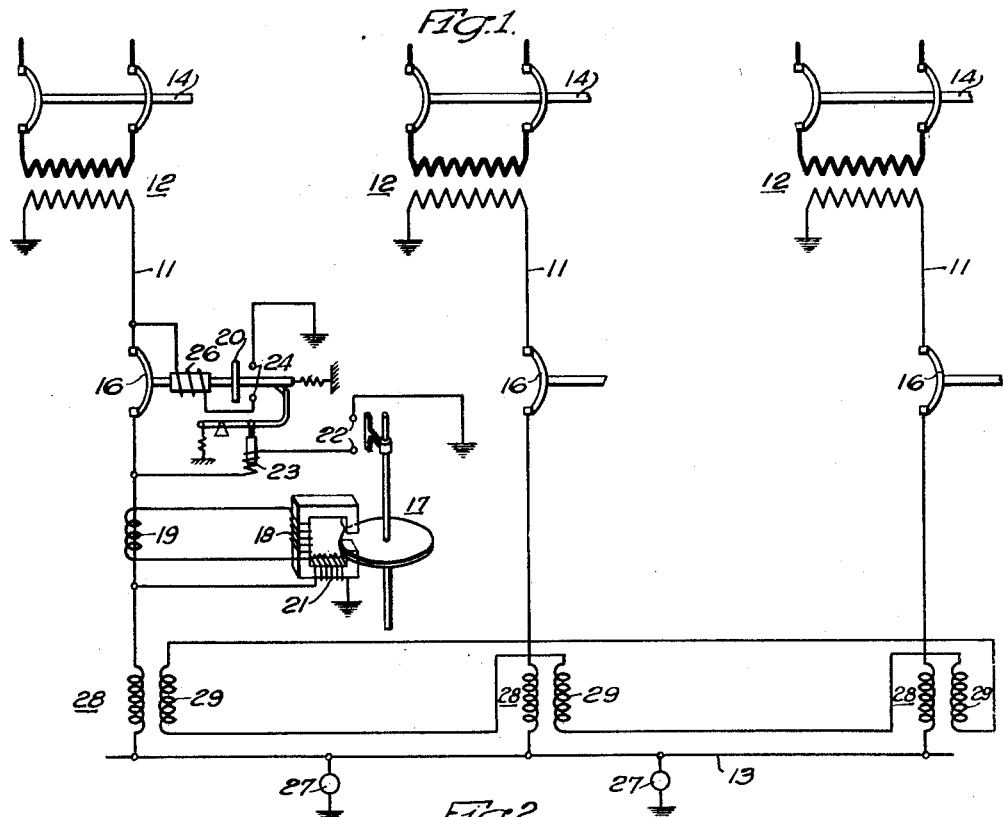
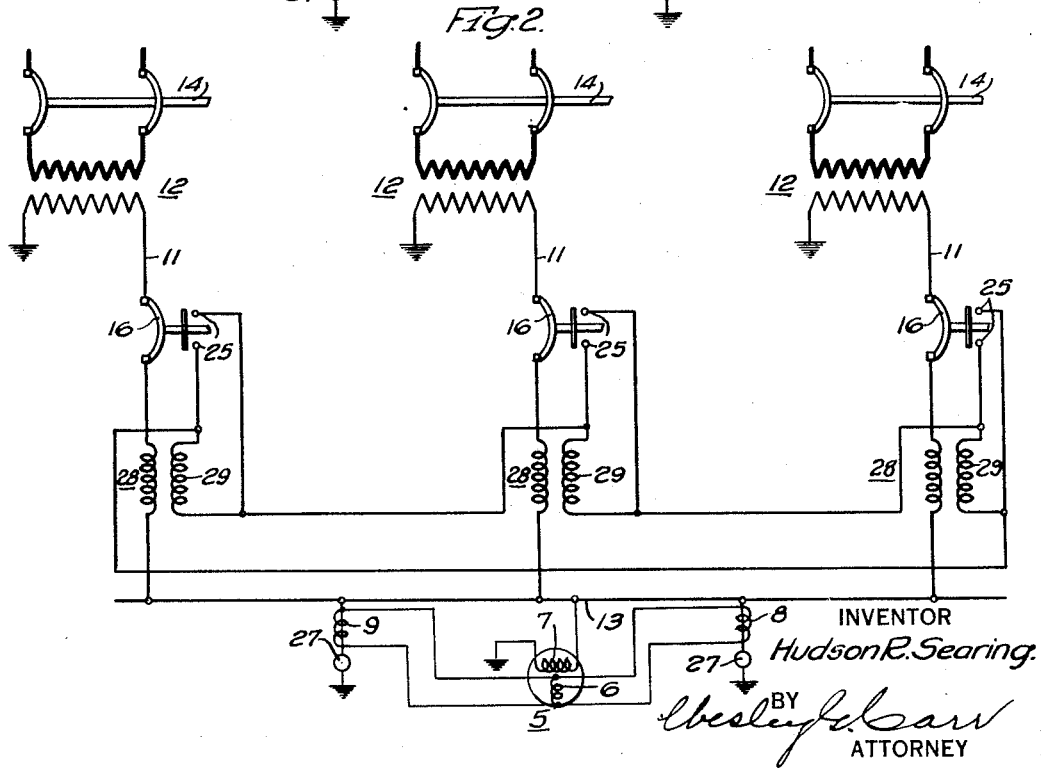
INVENTOR
Hudson R. Searing.
BY Chesley R. Carr
ATTORNEY Oct. 24, 1933.   H. R. SEARING   1,932,088
ALTERNATING CURRENT NETWORK DISTRIBUTION SYSTEM
Filed April 4, 1930   2 Sheets-Sheet 2
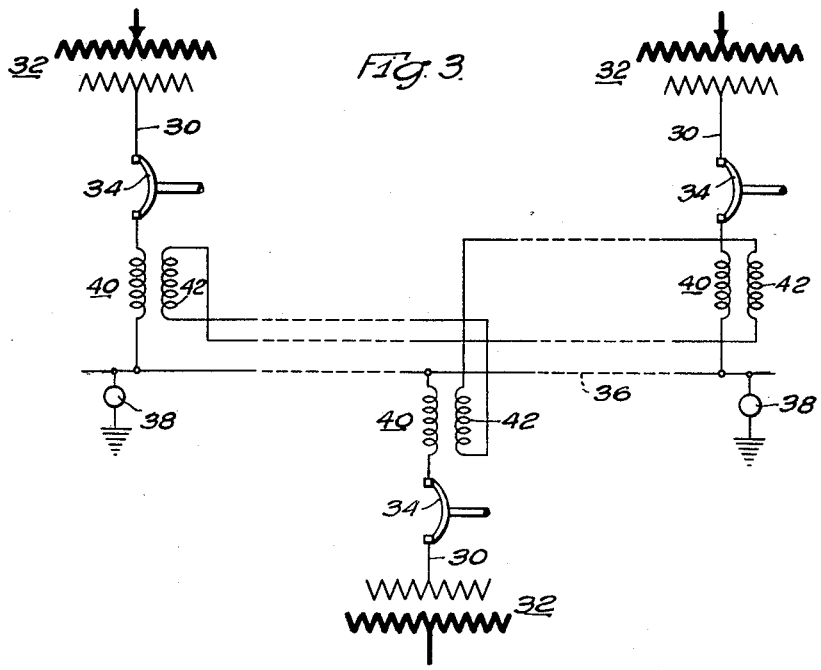
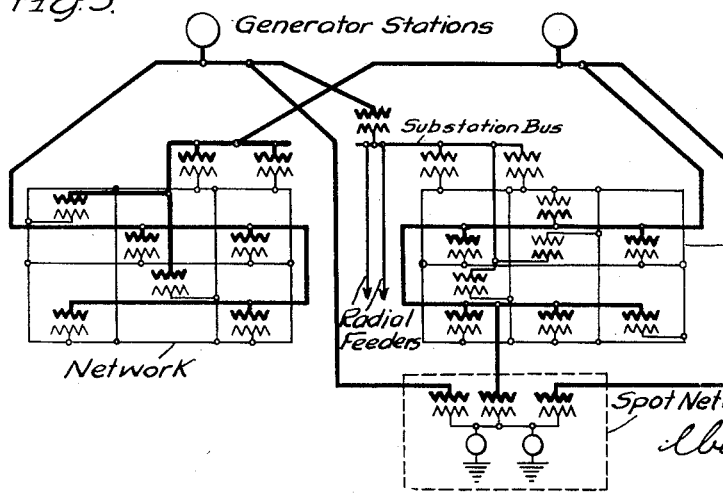
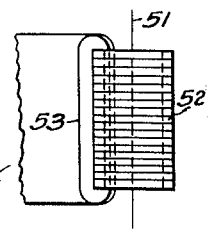
INVENTOR
Hudson R. Searing.
BY
ATTORNEY Patented Oct. 24, 1933

1,932,088

UNITED STATES PATENT OFFICE 1,932,088

ALTERNATING-CURRENT-NETWORK DISTRIBUTION SYSTEM

Hudson R. Searing, New York, N. Y.

Application April 4, 1930. Serial No. 441,665

4 Claims. (Cl. 171—97)

Power distribution for large metropolitan districts presents many difficulties to the operators of central stations in providing reliable and economical service. The problem is more difficult in connection with alternating-current network distribution than with the early direct-current distribution systems.

In perfecting and applying an alternating-current network to metropolitan service, several essential features are apparent. There must be a continuity of service equal to, or better than, a corresponding direct-current system, whereby faults on the low-voltage network will be burned off; faulty feeders must be isolated at both the supply and the load ends; proper action of protective units is essential, and insurance of the reconnection of the sources of supply to carry the load when other sources to the station bus have failed. Good voltage regulation is also necessary and is obtained by making the secondary mains of adequate size; correct application of secondary transformers; proper number and size of feeders; highest possible choice of secondary voltage, and means whereby the peak loads may be supplied at the voltage chosen.

In such systems, it is desirable to provide for the utmost simplicity in both the generating and the distributing portions, and to have more than one generating station and substation backing each secondary network for greater continuity of service.

The present form of alternating-current network consists of a distributing grid or network, served by a plurality of feeders. The grid is so designed and operated as to be self-clearing of faults which may develop upon it and is, therefore, limited in voltage and rating. Since the grid is fed by a plurality of feeders, it becomes a pool or reservoir of power, and the disconnection of feeders not supplying power will not jeopardize the supply to the pool and service from the pool.

Protective means are provided whereby the feeders are connected and remain connected to the grid, only so long as power flow is from the feeder to the grid, and the feeder is isolated at the load end whenever the power flow is from the grid to the feeder.

Several problems present themselves to the central station operators in the distribution of power with present network systems. With the use of high-voltage feeders, in the event one protector fails to clear when the source is opened, the charging current taken by the line is supplied from the grid. If the charging current of the cable predominates over the transformer magnetization current, the resultant current has such a phase position that the voltage of the feeder and the grid voltage, in the vicinity of the defective protector, may be raised to an abnormal value and cause damage to utilization equipment. Due to the high voltage on the feeder, other transformers connected to the feeder may be reconnected to the grid but will immediately and successively reopen and reclose, or "pump", unless the relay on the protector is designed to lock out the breaker under such abnormal conditions. A remedy for this condition has been to so connect shunt retractors on the feeder that the resultant current on a reverse-energy flow cannot assume a phase position which will cause high voltage on the grid.

With a network arrangement, as developed at the present time, the problem of circulating current set up between the various feeders, resulting from differences in voltage and phase position and load unbalance on the various transformers, is becoming increasingly important.

The acuteness of this problem is realized when the majority of the network installations are examined. The change-over from the radial systems to the latter developed network systems has not been fully completed, a combination of the two being of common occurrence, and, in addition, where the radial systems have been supplanted by network systems, the existing 4KV. systems were utilized and, as the load increased, sources were provided at a higher voltage such as 13KV. or 27KV. In the usual system, these higher-voltage feeders supply the substations from which the 4KV. circuits are fed. The result is, therefore, that transformers fed from 4KV. and 13KV. feeders, or other feeders of dissimilar voltage, are connected in parallel to the general network.

A general network may be briefly described as consisting of low voltage cables or mains in the streets of a community, interconnected at the street intersections to form a gridiron arrangement. Service to buildings adjacent the streets are tapped from the mains. The transformers supplying the general network grid are placed at positions depending upon the load distribution and, with uniformly distributed loads, are usually located at the street intersections, thereby facilitating the high-tension feeder layout.

The phase positions of the voltage on these feeders of varying capacity may be, and often is, considerably apart, and, because of the low reactance of the load connection between feeders, the difference in phase-angle characteristics is particularly noticeable, and objectionable. The operation of the network protectors is thereby rendered uncertain because changes in circuit conditions may swing the load from one circuit or feeder to another, and cause the protector in one feeder to open because of an energy flow from the leading to the lagging feeder. These conditions are aggravated when the size of the load requires that a number of transformers be used at one location without the inherent impedance of the secondary mains between transformer banks. This type of distribution is characterized as a "spot" network.

Several schemes have been devised for avoiding the above described troubles, each of which, while solving the immediate problem, introduce other undesirable conditions. The provision of reactance in the circuit between the transformers will reduce the circulating current, and increased reactance between each transformer and the load will equalize the loading of the transformers. However, such schemes result in poor regulation of the service voltage, and compromises must be made between the correct values of reactance required and values which are commercially practicable.

If the transformers in a "spot" network are connected together to the load, regulation will be good but circulating current may be high. Shunt-tripped protectors are in general use in the transformer feeders and the fact that the voltage may be very low on a number of protectors under certain fault conditions, will not cause any difficulty in the operation of the protectors.

In a "spot" network the load may be separated into as many portions as there are transformers, and the network established on an auxiliary bus to which each transformer is connected through its protector and a reactance. The regulation resulting from such arrangement is good under normal conditions and circulating current is reduced because of the highly reactive path between the transformers. However, in the event of a feeder failure, the load is supplied from the other transformers through their associated feeders and reactances, and poorer regulation results. In all installations of this type, therefore, the value of reactance used in the individual feeders must also be a compromise.

This arrangement suffers a further disadvantage in that the total capacity installed is not available for starting large motors, as the load has to be separated into portions and thus a large service becomes several smaller services.

It is an object of my invention, therefore, to provide means for avoiding the difficulties experienced with circulating currents, voltage-regulation and balancing of the transformer loads in an alternating-current distribution network of the self-contained type where transformers are located physically in close proximity to each other.

Another object of my invention is to provide, in a network distribution system, means for precluding the undesirable frequent operation of network protectors resulting from changes in the electrical conditions of the system.

Another object of my invention is to provide a simple and effective means for insuring proper network operation and service, which may readily be incorporated in existing and future metropolitan distribution systems.

A further object of my invention is to provide in a distribution system of the above indicated character, means providing maximum reactance to circulating currents and minimum reactance to load currents.

A still further object of my invention is to permit the paralleling of out-of-phase sources to the load even when the various sources have different energy ratings.

Another object of my invention is to simplify the closing characteristics of the protector relay so that the closing function need not be limited to a restricted definite phase relationship between the feeder and network.

Another object of my invention is to provide a spot network having a common potential, thereby being particularly adaptable to a simplified load metering arrangement in contradistinction to a plurality of meters and a totalizing means therefor.

Further objects and advantages of my invention will be apparent from the following description of the structure and mode of operation of my invention.

Fundamentally, my invention is based upon the fact that the reactance of a winding may be reduced to a minimum value by providing a short-circuited winding so that the flux of the main winding passes through the short-circuited winding. In effect, the arrangement as described may be considered as a current transformer which, with the secondary open-circuited, offers full reactance to the flow of current in the primary circuit and, with the secondary short-circuited offers minimum reactance to the flow of current in the primary circuit.

In accordance with the present invention, I propose to connect the transformer feeders of a plurality of individual sources, through equalizing series connected reactors or current transformers, to a low-voltage network. The combination of more than one feeder and associated transformers and network protectors supplying a heavy service, such as in a large building installation will be referred to as a "spot" or "concentrated" network, the feeders being connected to a paralleling bus from which the load is tapped.

For a complete understanding of my invention, reference is made to the various figures of the drawings, wherein Figure 1 is a diagrammatic illustration of an embodiment of my invention as applied to a "spot" network;

Fig. 2 is a similar view illustrating a modification of the embodiment shown in Fig. 1, including an auxiliary means for controlling the effect of the equalizing series connected reactor means; and a simplified load metering means;

Fig. 3 diagrammatically illustrates an application of my invention to a network system of the distributed-load type;

Fig. 4 illustrates, diagrammatically, a further modification of my invention, wherein the transformers supplying the respective feeders are designed to provide a high reactance to circulating currents and a minimum reactance to the flow of load currents;

Fig. 5 is a diagrammatic representation of a complete distribution system to which the present invention is applicable;

Fig. 6 is a view of a portion of a reactor which may be utilized in the practice of my invention.

For the purpose of affording a clearer understanding of the general type of distribution circuit to which my invention is applicable, reference may be had to Fig. 5 which is a diagrammatic representation of a "synchronized-at-theload" type alternating-current distribution system. The generating stations are shown supplying power to a distribution system comprising radial feeders, network street mains, and a typical "spot" network. The distribution is shown to be at generator voltage, a transformer at the substation bus providing proper potential for the radial distribution; and network transformers in building or street vaults supplying network potential.

Heavy-service loads are supplied from the high-potential feeders and transformed to service voltage, several feeders being paralleled to a secondary bus and the loads supplied therefrom. These service loads are commonly referred to as "spot" networks and, in districts where the load density is very great, the feeders, transformers, protectors and bus are usually provided in building-vaults near the concentrated load.

Figure 1 is an enlarged showing of the "spot" network indicated in the broken line rectangle in Fig. 5. A plurality of parallel feeders 11 are energized from distribution transformers 12 for supplying power to a secondary bus 13. The transformers 12 may be of the same or of different power rating and are fed from separate generating or central stations (not shown) through suitable circuit-interrupting means 14. It is to be understood that the generating stations, although electrically connected at the secondary bus 13, may be either synchronized at the station buses (not shown) or at the load bus 13. For the purpose of explanation and because of the lately developed "synchronized-at-the-load" systems, my invention will be described as applied thereto, although it is equally applicable to all types of alternating-current systems of distribution without regard to the particular synchronizing means employed.

Each of the feeders 11 is provided with a protector comprising a circuit-interrupting means 16 and a sensitive reverse-power relay 17. Inasmuch as the breaker and relay connections may be substantially the same for each of the feeders, such connections are shown as applied to only one of the feeders for purposes of simplification.

The relay 17 is actuated only when power flow is from the secondary bus 13 to a feeder 11.

The network protector, preferably, is similar, in purpose and function, to that disclosed in the patent to Palmer, No. 1,597,865, issued August 31, 1926, although any suitable arrangement for accomplishing a desired system operation may be utilized.

The principal requirement for protectors of this general character are, briefly, that the feeder shall be interrupted upon the occurrence of a reverse-energy condition therein, or when the flow of energy is from the load bus 13 to the transformer 12; and the feeder should be reconnected for service when the voltage conditions across the open interrupter contacts are such that the transformer is in energy-delivering relation with respect to the load bus. As a result of these characteristics, a fault in the transformer 12 or the high-tension circuit connected thereto, or opening of the primary breaker 14, will result in the opening of the interrupter 16.

In the present invention, the above-mentioned closing feature of the network protector is novel in that the limits to which the relay must work can be much broader than those necessitated by present applications not utilizing my proposed combination. As will be pointed out in more detail hereafter my invention provides that an incoming feeder is forced to take a portion of any load connected to the load network. As a result, the phasing feature, included in the known highly developed protectors, is no longer required to obviate the difficulties encountered with "pumping" of the protector under normal conditions. Therefore, the network protector, included in the present invention may be merely a sensitive reverse-energy relay. The only phasing feature required would be to protect against large phase differences such as result from crossed phase conditions and the possible resultant pumping of the protector.

The relay 17 is represented as being of the induction-disc type having a current winding 18 energized in accordance with the current flowing in the feeder 11, by means of a current transformer 19 electrically associated with the feeder; and a voltage winding 21 energized in accordance with the voltage of the feeder 11 on the load side of the interrupter 16. It is to be understood that modifications and refinements may be made, in the relay illustrated, which are obvious to those skilled in the art, without departing from the scope of the present invention.

In the event of a power-reversal, or a flow of power from the bus 13 to a transformer 12, the relay 17 will be actuated to close its contacts 22, thereby energizing a trip coil 23 of the circuit-interrupter 16 to disconnect the feeder 11 from the bus 13. A pair of contacts 24 are closed by a pallet switch 20, upon the opening of the circuit-interrupter 16, to complete the circuit to a closing coil 26 for reclosing the circuit-interrupter 16 when the voltage on the transformer 12 is of a predetermined magnitude.

Particular attention is directed to the closing limits since the protector may be designed to close whenever a predetermined voltage, regardless of phase position, exists on the transformer or feeder and remain closed unless energy flows from the network to the feeder. This feature is very important since a simplified network protector offers very material advantages over the known complicated network protectors.

In a preferred embodiment of my invention, reactances 28 may be placed in series with each of the feeders 11, between the feeder-circuit interrupter 16 and the secondary bus 13. Each reactor 28 may be provided with a secondary winding 29 having any desired ratio to the main or primary winding 28. The secondary windings 29, associated with the respective feeders 11, are connected in series, the arrangement of the reactors 28 and secondary windings 29 being similar to current transformers having the secondary windings thereof series connected.

Neglecting the secondary windings 29 and assuming that each feeder 11 has only the reactance 28 inserted between the network protector and the paralleling bus 13 from which the loads 27 are tapped, full reactance is in series with each source 12, as far as load current is concerned, and is also in circuit with respect to circulating current flowing between the sources 12.

The series or balancing connection of the auxiliary or secondary windings 29, results in voltages being set up therein in accordance with the load currents flowing in the feeders 11. The secondary ampere turns balance out the primary ampere turns and a neutralizing current is, therefore, cause to flow, reducing the effective reactance of the primary windings 28, to load currents, to a minimum value. If the phase position or magnitude of any of the feeders 11 is changed, the tendency is towards the flow of unbalanced or circulating currents. This results in an unbalance in the primary and secondary ampere turns thereby causing a reactive drop in the primary circuit to compensate for the difference in voltage or phase angle. Therefore, circulating currents between the feeders set up opposing voltages in the respective secondaries so that no secondary current flows and, therefore, full reactance to circulating currents is afforded since there are no compensating ampere turns present in the secondary windings.

It has been determined, in an operative embodiment of my invention, that during normal conditions on the system, the effective reactance of the reactors to load currents is only a fraction of one percent; but that, upon the occurrence of a fault condition in any of the supply circuits all the reactance of the reactor, associated with the faulted feeder or supply circuit, is effective to limit the value of fault current flowing from the network to the fault. As a result, the value of voltage on the network-load circuit will be less affected by faults on any of the supply circuits than if my arrangement were not applied to the system.

If one of the sources 12 is out of service, its associated feeder 11 will be open, and the load will be served from the remaining sources 12. The load currents of the remaining feeders 11, passing through the primary windings 28, will cause neutralizing current to flow in the auxiliary windings 29 which, in this case, will be approximately two-thirds of the short-circuited value and will result in the total remaining reactance in series with the load amounting to about one-third of the value that would have resulted had the auxiliary windings 29 not been used.

The equalizing-series-connected reactors are shown between the network protector and the secondary bus, although the reactors may also be placed between the source transformers 12 and the respective network protectors. In the former position, the protector operation is not affected by a short circuit on the secondary bus or associated load. The service voltage-regulation is only slightly affected with a source out of service in either form of connection, and the load tends to balance between the several sources.

In Fig. 2, the relay and circuit-interrupter connections are omitted for the purpose of simplifying the drawing, but may be the same as the connections shown in Fig. 1. The modification of the invention represents an ideal arrangement of the differentially-connected reactors for providing maximum reactance to circulating currents and minimum reactance to load currents at all times.

The secondary windings 29 are series connected, as in Fig. 1, with the added feature of providing means for short-circuiting the secondary winding associated with an open feeder. As indicated diagrammatically, the opening of a circuit-interrupter 16 causes a pair of contacts 25 to be bridged, thereby short-circuiting the secondary winding associated with the open feeder.

In this arrangement no voltage will be induced in the reactor 28 in the open feeder. This arrangement also provides for maximum reactance to circulating currents and minimum reactance to load currents, the system becoming stabilized and operating as though all of the required number of sources were connected to the network.

The short-circuiting of the reactor secondary, associated with an open feeder, not only prevents false protector operation but provides for better regulation since the impedance to load currents is decreased in the remaining feeders when the open feeder is out of service.

It is to be understood that any means desired may be utilized for short-circuiting the respective secondary windings, the means shown being merely diagrammatic.

Another important feature resulting from my invention is that a comon load bus 13 is provided, thereby resulting in a common load potential. Heretofore, concentrated loads could not be supplied from a common secondary bus in the usual star bus arrangement, and the consumers load had to be separated and metered independently. This disadvantage is particularly noticeable and increases the metering expense when demand measurement is required. For such demand measurement, a totalizing arrangement was necessitated.

A single meter 5, having a current winding 6 and a voltage winding 7, may be associated with the load network in order to measure the total load supplied to the services 27. The voltage coil 7 is connected across the bus 13 and ground, and is therefore energized by a potential which is common to the loads 27. The current coil 6 is connected in parallel with the secondary windings of current transformers 8 and 9, the transformers being energized in accordance with the current supplied to the respective loads 27. The single meter 5 therefore indicates the energy consumption of the loads 27 and greatly simplifies the necessary metering equipment.

While I have indicated a meter having only one current winding, it is obvious that the meter may include a plurality of current windings energized in accordance with the current supplied to the respective loads 27. It should be understood that the meter 5 may be of any type providing it is responsive to a single load potential and a plurality of load currents. This meter is preferably of the induction disc type (not shown).

Fig. 3 shows my invention as applied to a distributed-load arrangement, wherein the sources are connected to the same paralleling bus but are spaced at a considerable distance from each other.

A plurality of parallel feeders 30 are fed from source transformers 32 through circuit-interrupting means 34 to a street main 36. This arrangement is similar to the "spot" network as shown in Fig. 1, with the exception that the sources 32 are remotely disposed, with respect to each other, to supply loads as indicated at 38, or "spot" networks, of the type shown in Fig. 1. A reactor 40 may be connected in series relation with each of the feeders 30, between the circuit-interrupter 34 thereof and the street main 36.

Secondary windings 42 for the reactors 40, are series connected by auxiliary mains designed for low-current and high-voltage requirements.

The load currents of the plurality of feeders 30 are, therefore, offered minimum reactance by the reactors 40, while maximum reactance is offered to the flow of circulating currents. It is, therefore, possible to use my balancing arrangement of series-connected reactors or current transformers for balancing the load of a plurality of feeders, regardless of the distance between the feeders, and also for providing a maximum reactance to the flow of circulating currents, thereby permitting the utilization of simplified network protectors associated with the system and improving the regulation of the system.

In Fig. 4, special-source transformers 46 are provided having tertiary windings 48. The windings 48 of the respective transformers are series connected and have the same effect as series-connected reactors. The source transformers 46 may have special core and coil structures so that, when current of proper phase position and magnitude passes through the auxiliary circuit, the reactance is normal, and current of improper phase and magnitude, or no current, will result in greatly increasing the reactance.

Fig. 6 shows one form of reactor and associated secondary winding wherein a feeder or electrical conductor 51 extends through a central opening in an iron core, comprising a stack of punchings 52, and a secondary winding 53 also extends through the opening of the iron core 52.

In installations where iron-core reactors have been used, merely to provide reactance to load currents, the cores have been provided with air gaps, thereby increasing the reluctance and preventing saturation of the cores. My invention adapts itself to reactors of this type, since the secondary winding may also extend through the opening in the core. Further, since a secondary winding is provided, it becomes unnecessary to provide an air-gap in the core, the magnetic flux in the core linking with both the primary and the secondary windings.

Reactors and secondary windings of any suitable type may be used, the ratio of the turns of the two windings being chosen for the particular application intended.

A combination of equalizing series-connected reactors or current transformers, as described, meets the requirements for self-contained and distributed-load networks because minimum reactance is provided for load currents and the load current is balanced between the sources. The circuit tends to so balance the effective reactance that, if one source takes more than its share of the load, the reactance in series with that source is increased, while the reactance in series with the other sources is decreased proportionately. An incoming feeder is therefore required to assume part of the network load even though the magnitude and phase position of that feeder differs substantially from the magnitude and phase position of the other feeders.

The provision of maximum reactance to the flow of circulating currents allows sources of different characteristics to be connected together at the load and, even though the sources are considerably apart in phase position, the use of larger reactors in the various feeders will permit the load to be served satisfactorily.

As may be readily understood, my invention, although eliminating the troubles heretofore encountered in insuring continuity of service and good voltage regulation, does not limit itself to applications in existing alternating-current networks, but the balancing scheme may be applied to simplify all alternating-current network protector arrangements. All of the figures are representative single-line drawings, my invention being applicable to both single-phase and polyphase systems.

It may thus be seen that I have provided a balancing arrangement wherein the reactors may be so designed that circulating currents will be kept down to such a small value that the network protector will not be tripped for out of phase conditions existing on the several feeders. Further, it is only necessary that the incoming feeder voltage be within the range of balance provided by the circuit, and the protector may be allowed to close if the voltage approaches normal, without respect to phase position if the balancing range is sufficient to accommodate any known system variations.

The provision of a common paralleling bus from which the different services may be tapped has also provided a simple and accurate means for the measurement of the total energy consumed by the various loads at a "concentrated" or "spot" network. The resulting common potential obviates the necessity of a meter for each load and represents a marked advantage in cases where all of the loads must be totalized.

The series-connected reactors may readily be housed in a unit structure containing bus, reactor and protector, as well as other equipment, and this adaptability of my invention to existing network protector arrangements offers an economical solution for eliminating the troubles hereinabove enumerated and for simplifying the operating conditions incident to existing and future types of networks.

Various modifications may be made in my invention without departing from the spirit and scope thereof, and I desire, therefore, that only such limitations shall be placed thereon as are imposed by the prior art and set forth in the appended claims.

I claim as my invention:

1. In an alternating current system of distribution, the combination including a load network, a plurality of sources associated therewith and adapted to supply power thereto, transforming means associated with said sources, a plurality of feeder circuits connecting said transforming means and said load network, circuit-interrupting means associated with each of said feeder circuits, control means for each of said circuit-interrupting means including a sensitive directional relay responsive to the feeder voltage and current when said circuit-interrupting means is closed and responsive to only the feeder voltage when said circuit-interrupting means is open, reactor means connected in series with each of said feeder circuits between said transforming means and said load network, and winding means inductively associated with each of said reactor means, said winding means being connected in series circuit relation with each other.

2. The combination including a network load circuit, a plurality of feeder circuits electrically associated therewith, circuit-interrupting means disposed in each of said feeder circuits, control means for each of said circuit-interrupting means including a sensitive directional relay responsive only to the feeder voltage when the associated circuit-interrupting means is in open position, reactive impedance means disposed in each of said feeder circuits, winding means inductively related with each of said reactive impedance means, and means for connecting said winding means together in such manner as to effect a load balance between any number of feeder circuits electrically associated with said network load circuit.

3. In a distribution system of the network type, a network load circuit, a plurality of feeder circuits for supplying power to said load circuit, a circuit interrupter included in each of said feeder circuits, control means for each of said circuit interrupters, each of said control means including directional opening means operable in response to predetermined abnormal conditions involving power flow from said load circuit to the corresponding feeder circuit and automatic closing means operable in response to predetermined normal voltage conditions involving energization of the corresponding feeder circuit, mutual reactance means included in each of said feeder circuits, each of said reactance means having a secondary winding, and conductors connecting said secondary windings in a series circuit in such relative directions that the impedance of said reactance means to load currents divided in a predetermined ratio among said feeder circuits is a minimum and the impedance of said reactance means to current components tending to disturb said ratio is substantial, whereby unnecessary operations of said opening means are reduced in number without substantial interference to the voltage regulation of said load circuit.

4. In a distribution system of the network type, a network load circuit, a plurality of feeder circuits for supplying power to said load circuit, a circuit interrupter included in each of said feeder circuits, control means for each of said circuit interrupters, each of said control means including directional opening means operable in response to predetermined abnormal conditions involving power flow from said load circuit to the corresponding feeder circuit and automatic closing means operable in response to predetermined normal voltage conditions involving energization of the corresponding feeder circuit, a series reactor included in each of said feeder circuits, each of said reactors having a secondary winding, and conductors connecting said secondary windings in a series circuit in such relative directions that the impedance of said reactors to load currents divided in a predetermined ratio among said feeder circuits is a minimum and the impedance of said reactors to feeder current components tending to disturb said ratio is substantial, whereby unnecessary operations of said opening means are reduced in number without substantial interference to the voltage regulation of said load circuit.

HUDSON R. SEARING.